United States Patent
Jung

(10) Patent No.: US 8,390,758 B2
(45) Date of Patent: Mar. 5, 2013

(54) BACKLIGHT UNIT AND LIQUID CRYSTAL DISPLAY HAVING THE SAME

(75) Inventor: Sung Soo Jung, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 447 days.

(21) Appl. No.: 12/603,789

(22) Filed: Oct. 22, 2009

(65) Prior Publication Data

US 2010/0165233 A1 Jul. 1, 2010

(30) Foreign Application Priority Data

Dec. 29, 2008 (KR) .............................. 2008-0135695

(51) Int. Cl.
*G02F 1/1333* (2006.01)
(52) U.S. Cl. ...................................................... 349/58
(58) Field of Classification Search .................. 349/161, 349/58

See application file for complete search history.

(56) References Cited

U.S. PATENT DOCUMENTS

| | | | |
|---|---|---|---|
| 7,505,109 B2 * | 3/2009 | Cheng et al. | 349/161 |
| 7,864,258 B2 * | 1/2011 | Cho et al. | 349/58 |
| 8,031,292 B2 * | 10/2011 | Chun et al. | 349/65 |

FOREIGN PATENT DOCUMENTS

KR 20080002428 1/2008

* cited by examiner

*Primary Examiner* — James Dudek
(74) *Attorney, Agent, or Firm* — Stanzione & Kim, LLP

(57) ABSTRACT

A backlight unit and an LCD having the same. The backlight unit can include a light guide plate, a printed circuit board, a bottom cover and a fixing member. The printed circuit board can have at least one light emitting diode to emit light toward an incident surface formed at one side of the light guide plate. The bottom cover can receive the light guide plate and the printed circuit board therein. The fixing member can be formed with a recess section, into which the printed circuit board can be press-fitted, such that the printed circuit board is fixed to the fixing member. The assembling efficiency and reliability of the backlight unit can be improved.

21 Claims, 6 Drawing Sheets

BACKLIGHT UNIT AND LIQUID CRYSTAL DISPLAY HAVING THE SAME

CROSS-REFERENCE TO RELATED APPLICATIONS

This application claims the benefit of Korean Patent Application No. 10-2008-0135695, filed on Dec. 29, 2008, in the Korean Intellectual Property Office, the disclosure of which is incorporated herein by reference in its entirety.

BACKGROUND

1. Field of the Invention

The disclosure relates to a backlight unit and a liquid crystal display (LCD) having the same. More particularly, the disclosure relates to a backlight unit capable of improving productivity and reliability by improving the assembling efficiency thereof, and an LCD having the same.

2. Description of the Related Art

An LCD displays images using electrical and optical properties of liquid crystal. Since the LCD has advantages of slimness, lightweight, low power consumption and low driving voltage as compared with other display apparatuses, the LCD has been extensively employed in various industrial fields.

The LCD includes a liquid crystal display panel, in which liquid crystal is interposed between two transparent substrates and voltage is applied to the liquid crystal to change a direction of liquid crystal molecules to optically display images, and a backlight assembly for providing light to the liquid crystal display panel.

A CCFL (Cold Cathode Fluorescent Lamp), an EEFL (External Electrode Fluorescent Lamp), and an FFL (Flat Fluorescent Lamp) are used as light sources of the backlight assembly. However, the CCFL represents limitations in terms of high definition, light weight, slim structure and compact size, so an LED (Light Emitting Diode) has been recently used as the light source of the backlight assembly because the LED represents improved performance such as high brightness, long life span and high color purity. In addition, as restriction on dumping of dangerous substances such as mercury has been reinforced, the CCFL is less used, and the LED, which is an environmental friendly device, is widely used instead of the CCFL.

The backlight assembly having such an LED as the light source is classified into a direct-type backlight assembly and an edge-type backlight assembly according to the arrangement of the LED and the type of the light guide plate. The direct-type backlight assembly having the LED has a structure in which the LED is disposed in front of the backlight assembly, so the direct-type backlight assembly has a difficulty in achieving slimness and requires a large number of LEDs, increasing the manufacturing cost.

In contrast, the edge-type backlight assembly has a structure in which the LED is mounted at both sides of the backlight assembly and light is introduced into the front surface of the backlight assembly through a light guide plate, so the edge-type backlight assembly may have a thickness smaller than that of the direct-type backlight assembly, thereby realizing the slimness structure.

A backlight unit provided with the LED includes a box-shape bottom chassis having an open upper surface to sequentially receive a reflection plate, the light guide plate and optical sheets therein. In addition, a plurality of LEDs mounted on the printed circuit board are provided adjacent to a side of the light guide plate in the backlight unit.

Since the PCB is fixed to an inner wall surface of one side of the bottom chassis using a screw by a worker, a defect may occur during the assembling process. Further, a screw hole and a circuit pattern have to be formed in the PCB although the PCB has a small area.

SUMMARY

Example embodiments of the present general inventive concept can provide a backlight unit capable of improving the assembly efficiency thereof, and an LCD having the same.

Example embodiments of the present general inventive concept can also provide a backlight unit having an assembly structure capable of efficiently discharging heat generated from a plurality of LEDs, and an LCD having the same.

Additional embodiments of the present general inventive concept will be set forth in part in the description which follows and, in part, will be obvious from the description, or may be learned by practice of the general inventive concept.

Embodiments of the present general inventive concept can be achieved by providing a backlight unit including a light guide plate, a printed circuit board, a bottom cover and a fixing member. The printed circuit board can have at least one light emitting diode to emit light toward an incident surface formed at one side of the light guide plate. The bottom cover can receive the light guide plate and the printed circuit board therein. The fixing member can be formed with a recess section, into which the printed circuit board is press-fitted, such that the printed circuit board is fixed to the fixing member.

The fixing member can include heat conductive metal.

The fixing member can include an aluminum extrusion member.

The fixing member can be integrally formed with the bottom cover.

The recess section can be formed in one sidewall of the bottom cover.

The fixing member can include a support surface, which extends upward from a bottom surface of the bottom cover, and a pressing surface bent inward from an edge of the support surface.

The support surface can be formed at upper and lower ends thereof with concave sections.

The fixing member can further include a fixed protrusion to allow the printed circuit board to closely make contact with the support surface.

The fixed protrusion can protrude from the bottom surface of the bottom cover.

The fixed protrusion can have a semicircular section.

Example embodiments of the present general inventive concept can also be achieved by providing a liquid crystal display including a liquid crystal display panel and an edge-type backlight unit to supply light to the liquid crystal display panel. The backlight unit can include a light guide plate, a light source unit, a bottom cover and a fixing member. The light source unit can irradiate the light onto the light guide plate. The bottom cover can receive the light guide plate and the light source unit therein. The fixing member can be formed with a recess section, into which the light source unit is press-fitted, such that the light source unit is fixed to one side of an inner portion of the bottom cover.

The light source unit can include at least one light emitting diode, and a metal printed circuit board on which the light emitting diode is mounted.

The fixing member can include a support surface closely making contact with a rear surface of the metal printed circuit board, and a pressing surface to press a top surface of the metal printed circuit board.

The fixing member can include heat conductive metal.

The fixing member can include an aluminum extrusion member.

The fixing member can be integrally formed with the bottom cover.

The fixing member can further include a fixed protrusion to prevent the metal printed circuit board from being separated from the recess section by allowing the metal printed circuit board to make contact with the support surface.

The fixed protrusion can protrude from the bottom surface of the bottom cover and can have a semicircular section.

The printed circuit board can be press-fitted to the fixing member to assemble the printed circuit board to the bottom cover to facilitate ease of assembly to improve assembly efficiency.

Further, when the printed circuit board is press-fitted into the fixing member comprising heat conductive metal material, the printed circuit board can closely contact the fixing member through surface contact to improve heat dissipation efficiency.

Example embodiments of the present general inventive concept can also be achieved by providing a backlight unit of an LCD panel, including a light source, a light guide plate having an edge surface to receive light from the light source, and a cover member to receive the light guide plate and the light source therein, and having a recessed portion to press-fit the light source therein and to dissipate heat of the light source.

The cover member can include a bottom surface to support the light guide plate, and the recessed portion can include a top surface to press the light source against the bottom surface.

The bottom surface can include a protruding portion to retain the light source against a side surface of the recessed portion.

The recessed portion can include a side surface adjoining the top and bottom surfaces to contact a back surface of the light source to dissipate heat from the light source.

The recessed portion can include concave portions disposed at adjoining portions of the top and side surface and the bottom and side surface, respectively, to alleviate deformation when the light source is press-fitted to the recessed portion.

BRIEF DESCRIPTION OF THE DRAWINGS

The above and other embodiments of the present general inventive concept will become apparent and more readily appreciated from the following description of the example embodiments, taken in conjunction with the accompanying drawings of which.

DETAILED DESCRIPTION OF THE EMBODIMENTS

Figure 1:
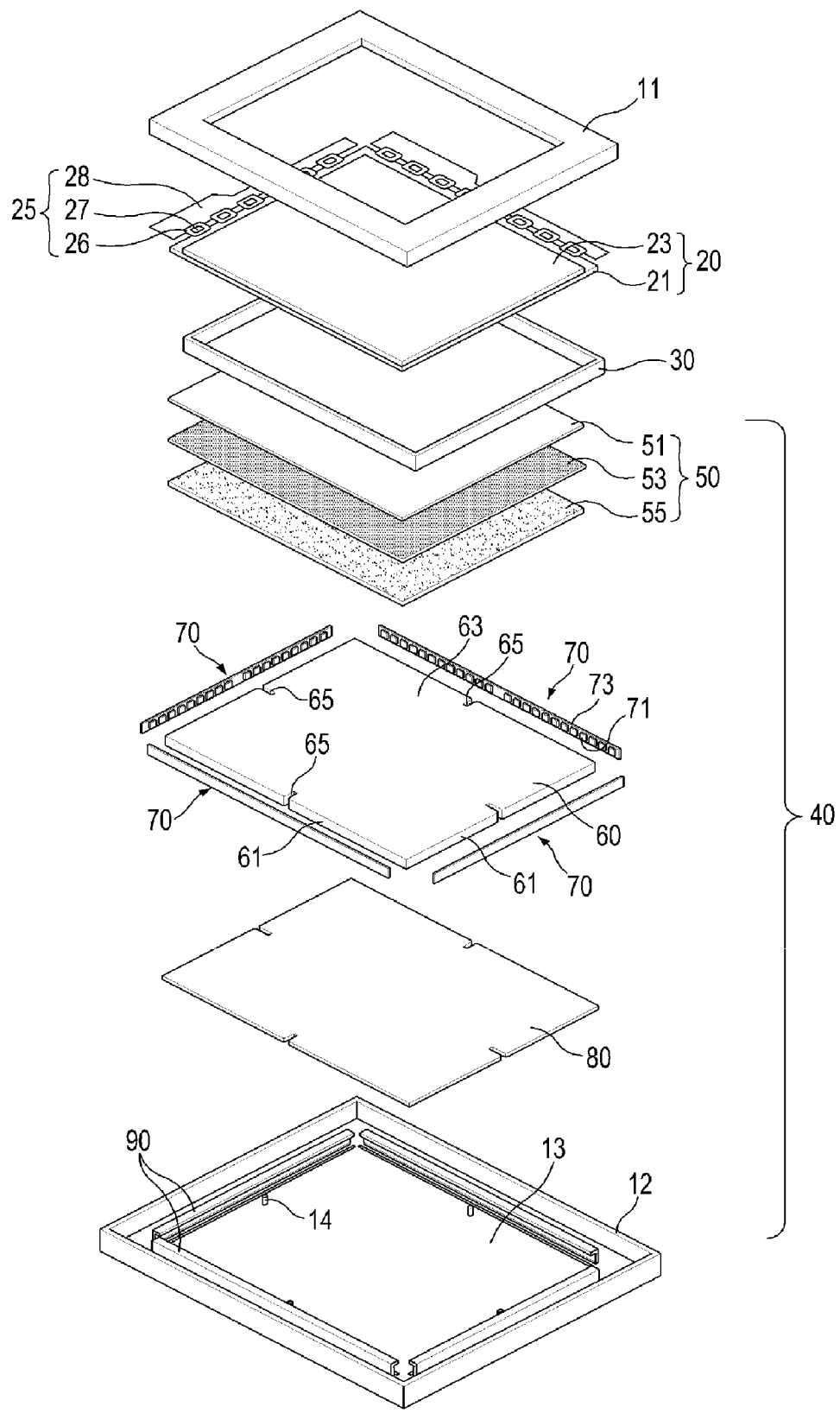
FIG. 1 is an exploded perspective view illustrating an LCD according to an embodiment of the present general inventive concept.

Reference will now be made in detail to the embodiments of the present general inventive concept, examples of which are illustrated in the accompanying drawings, wherein like reference numerals refer to the like elements throughout. The embodiments are described below in order to explain the present general inventive concept by referring to the figures.

As illustrated in FIG. 1, the LCD according to an embodiment of the present general inventive concept can include an LCD panel 20, and a backlight unit 40 disposed below the LCD panel 20.

A top cover 11 having a rectangular frame shape with an open center portion can be provided to form an external appearance of the LCD in combination with a bottom cover 12.

The LCD panel 20 and the backlight unit 40 can be accommodated between the top cover 11 and the bottom cover 12, and the LCD panel 20 can be seated on a mold frame 30 including plastic material.

The LCD panel 20 can include a thin film transistor substrate 21 having a thin film transistor, a color filter substrate 23 facing the thin film transistor substrate 21, a liquid crystal layer (not illustrated) interposed between the thin film transistor substrate 21 and the color filter substrate 23.

A driving unit 25 can be provided at one side of the thin film transistor substrate 21 to apply a driving signal.

The driving unit 25 can include a flexible printed circuit board (FPCB) 26, a driving chip 27 mounted on the FPCB 26, and a PCB 28 connected with one side of the FPCB 26.

The driving unit 25 can be provided through a chip on film (COF) scheme. Further, the driving unit 25 may be provided through a well-known scheme such as a tape carrier package (TCP) and a chip on glass (COG). The driving unit 25 may also be mounted on the thin film transistor substrate 21.

The LCD panel 20 can display an image by adjusting alignment of the liquid crystal layer. However, since the LCD panel 20 is a non-emissive device, the LCD panel 20 receives light from the backlight unit 40.

The backlight unit 40 can include an optical film 50 positioned below the LCD panel 20, a light guide plate 60 positioned under the optical films 50, light source units 70 disposed at opposite surfaces of the light guide plate 60, and a reflection plate 80 positioned under the light guide plate 60.

The optical film 50 can include a protective film 51, a prism film 53 and a diffusion film 55.

The diffusion film 55 can include a base plate provided with a coating layer having a bead pattern such that the diffusion film 55 diffuses light from the light source units 70 to supply the LCD panel 20 with the light.

The prism film 53 can be provided on an upper surface thereof with prisms, which can be aligned in a predetermined pattern and have a triangular column shape, such that the prism film 53 can collect the light diffused by the diffusion film 55 in the direction perpendicular to a plane of the LCD panel 20. In general, the prism film 53 can have a dual layer structure. Microprisms formed on each prism film 53 can form a predetermined angle therebetween. Most light passing through the prism film 53 vertically travels upward, so that uniform brightness distribution can be achieved.

The protective film 51 can be positioned on the prism film 53 to protect the prism film 53 sensitive to scratch caused by dust.

The light guide plate 60 can be provided as acryl-based resin such as polymethylmethacrylate (PMMA), or polymethylstyrene-methylmethacrylate-styrene copolymer. The light guide plate 60 allows the light from the light source units 70 to be uniformly supplied to the diffusion film 55.

The light guide plate 60 can include incident surfaces 61 facing the light source units 70, an exit surface 63 facing the diffusion film 55, and a reflection surface (not illustrated) provided in parallel to the exit surface 63.

Each light source unit 70 can include a plurality of light emitting diodes (LED) 71 to emit light, and a printed circuit board (PCB) 73 on which the LEDs 71 can be mounted. The PCB 73 can apply an electrical signal to the LEDs 71.

The LEDs 71 may emit white light. Further, the LEDs 71 can be provided in the form of a combination of LEDs to emit red light, green light and blue light.

The PCB 73 can be provided in the form of a metal PCB including silicon steel plate, galvanized steel plate or aluminum disk, which has superior heat conductivity. The PCB 73 can supply a driving signal to the LEDs 71 and can dissipate heat generated from the LEDs 71 to an outside of the PCB 73.

The light source units 70 can face at least one side of the light guide plate 60 to irradiate light toward the incident surfaces 61, which in turn can be formed around the light guide plate 60 from positions corresponding to opposite sides of the light guide plate 60.

Figure 2:
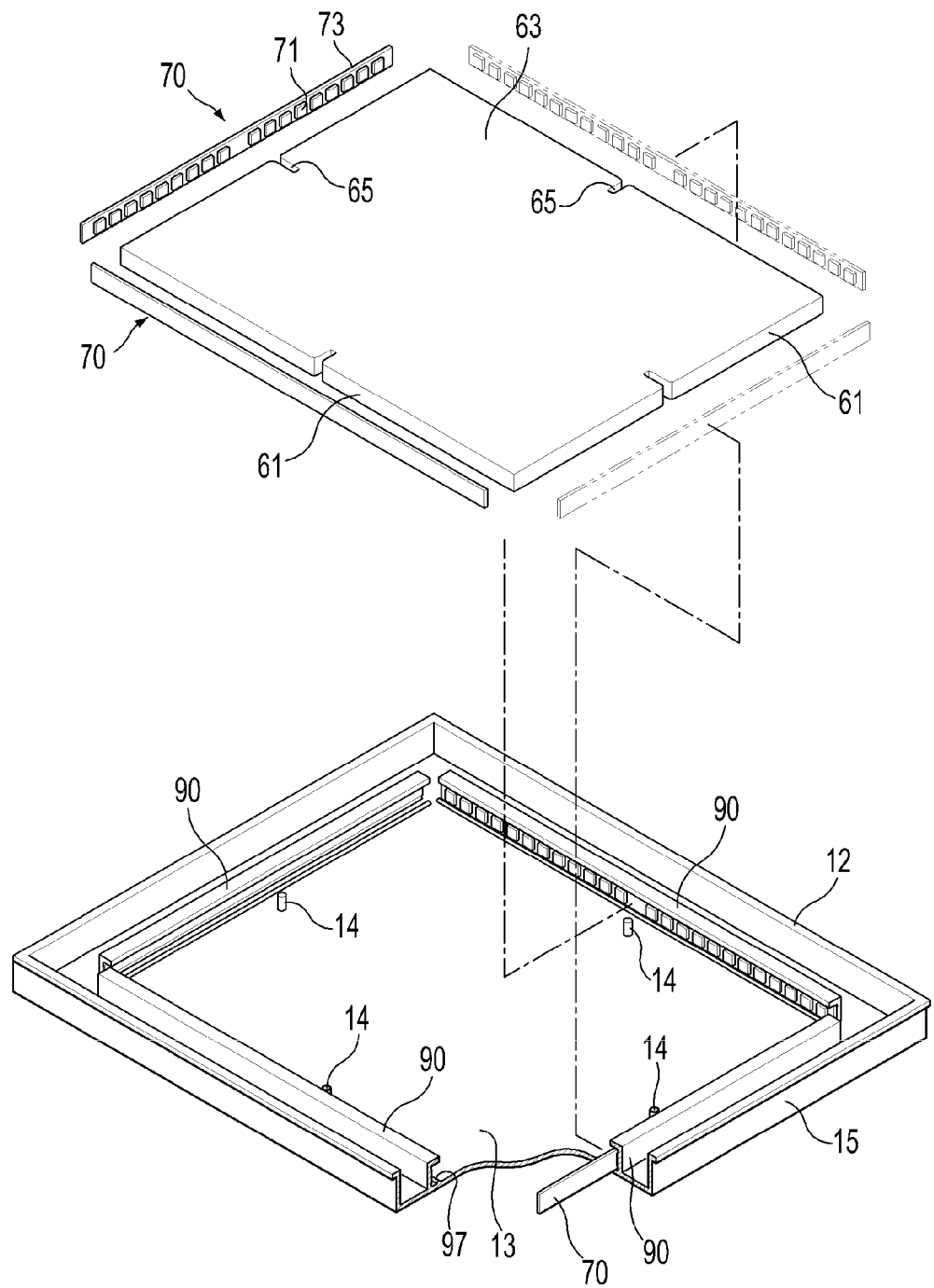
FIG. 2 is a perspective view illustrating a part of the LCD illustrated in FIG. 1.

That is, as illustrated in FIGS. 1 and 2, the light source units 70 can be disposed adjacent to four sides of the light guide plate 60 while facing each other, although the present general inventive concept is not limited thereto. For example, in other example embodiments, the light source units 70 can be disposed at only one lateral side of the light guide plate 60.

Referring to FIG. 1, the reflection plate 80 can be positioned under the light guide plate 60 to reflect light to the light guide plate 60 when the light is supplied to the reflection plate 80 through the light guide plate 60. The reflection plate 80 may include plastic material such as polyethyleneterephthalate (PET) or polycarbonate (PC).

The light guide plate 60, the light source units 70 and the reflection plate 80 can be accommodated in the bottom cover 12. The bottom cover 12 can be coupled with the mold frame 30 including synthetic resin having insulation characteristics.

The bottom cover 12 can have a box shape with an open top surface, although other shapes could also be used without departing from the broader principles and spirit of the present general inventive concept. The reflection plate 80 can be seated on a bottom surface 13 of the bottom cover 12 and the light guide plate 60 can be seated on a top surface of the reflection plate 80.

Referring to FIG. 2, the light guide plate 60 can be formed with incised parts 65 such that the light guide plate 60 can be coupled with the bottom cover 12 via cylindrical support parts 14. For example, as illustrated in FIG. 2, the bottom cover 12 can be provided at the bottom surface 13 thereof with cylindrical support parts 14 corresponding to the incised parts 65 of the light guide plate 60 to couple the light guide plate 60 to the bottom cover 12.

Thus, when the light guide plate 60 is seated on the bottom surface 13 of the bottom cover 12, the support parts 14 can protrude from the bottom surface 13 such that the support parts 14 can be inserted into the incised parts 65 of the light guide plate 60 to fix the light guide plate 60 to the bottom cover 12.

After the light guide plate 60 is fixed to the bottom cover 12, a predetermined space can be formed between the light guide plate 60 and sidewalls 15 of the bottom cover 12, as illustrated in FIG. 2.

Here, fixing members 90 can be formed in the space such that the PCBs 73 having the LEDs 71 can be press-fitted into the fixing members 90.

Figure 3:
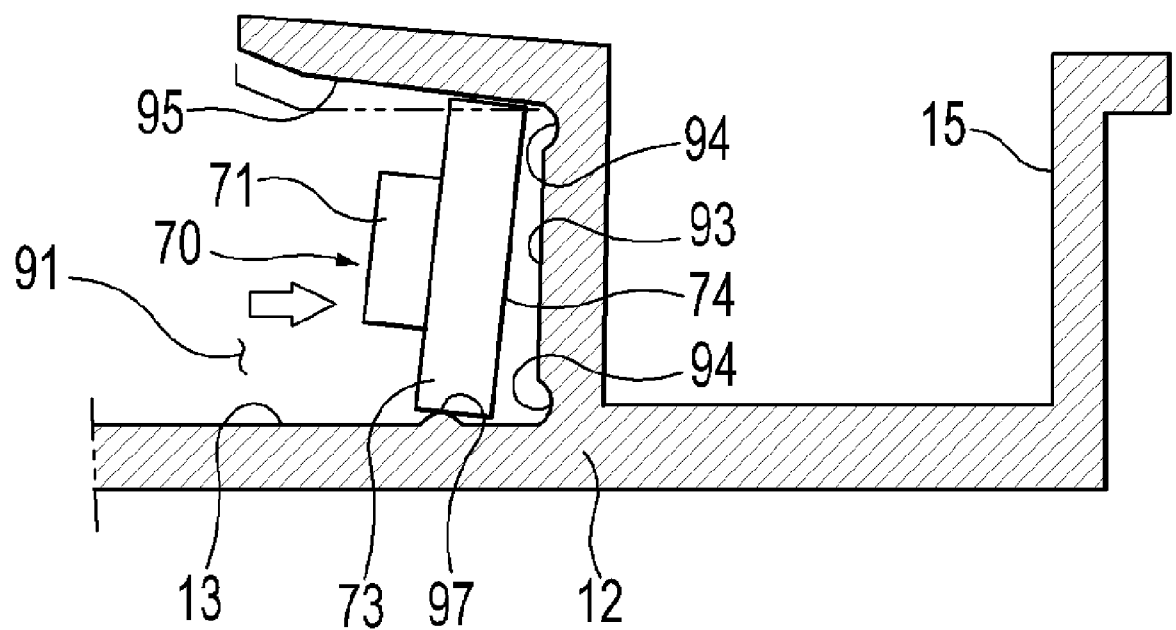
FIG. 3 is a sectional view illustrating an assembly process of a light source unit according to an embodiment of the present general inventive concept.
Figure 4:
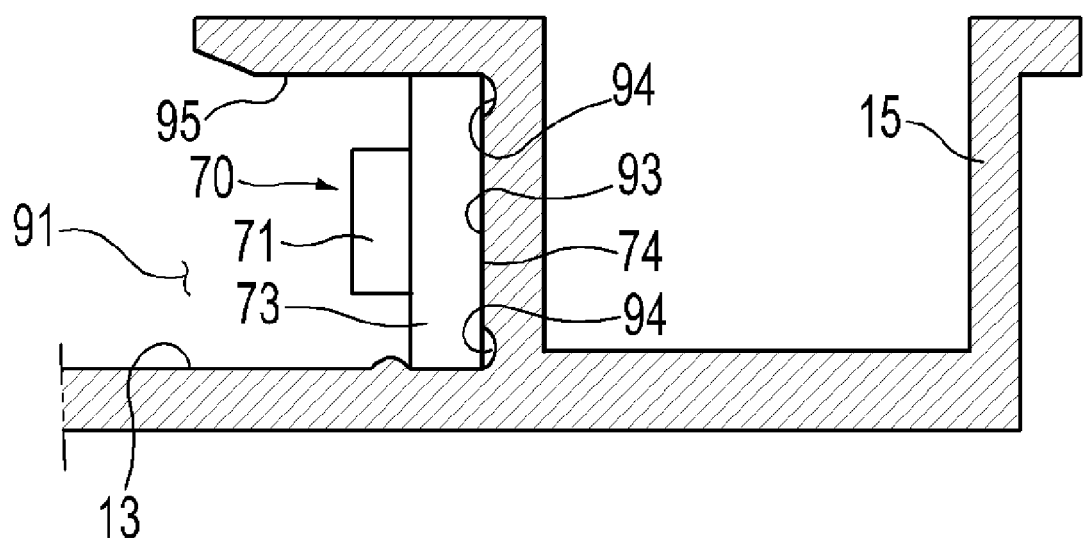
FIG. 4 is a sectional view illustrating a light source unit fixed to a fixing member according to an embodiment of the present general inventive concept.

Referring to FIGS. 3 and 4, each fixing member 90 can include a support surface 93 extending upward from the bottom surface 13 of the bottom cover 12 such that a recess section 91, into which the PCB 73 is press-fitted, can be formed, and a pressing surface 95 can be bent inward from an end of the support surface 93.

If the PCB 73 is press-fitted into the recess section 91 of the fixing member 90, the support surface 93 can make close contact with a rear surface 74 of the PCB 73 and the pressing surface 95 can press a top surface of the PCB 73, so that the PCB 73 can be fixed to the fixing member 90.

The support surface 93 can have a height relatively lower than that of the PCB 73. The support surface 93 can be formed at upper and lower ends thereof with concave sections 94 to distribute stress caused by deformation of the pressing surface 95 when the PCB 73 is press-fitted into the recess section 91.

The fixing member 90 can include aluminum material having superior heat conductivity. The fixing member 90 may be provided with an extrusion member such that the fixing member 90 is fixed to the bottom cover 12. Further, the fixing member 90 may be integrally formed with the bottom cover 12.

A fixed protrusion 97 can be positioned at an inner portion of the recess section 91 of the fixing member 90 to protrude from the bottom surface 13 of the bottom cover 12 by a predetermined height.

When the PCB 73 is press-fitted into the recess section 91, the fixed protrusion 97 can prevent the PCB 73 from being separated from the fixing member 90 while allowing the rear surface 74 of the PCB 73 to make close contact with the support surface 93 to facilitate dissipation of heat from the PCB 73 and LEDs 71. For example, in this exemplary configuration, heat generated from the LEDs 71 can be transferred to the support surface 93 of the fixing member 90 comprising a material such as aluminum material having superior heat conductivity, and then dissipated out of the LCD through the bottom cover 12. Thus, heat dissipation efficiency can be improved.

The fixed protrusion 97 can have a rounded top surface such that the PCB 73 can be easily press-fitted into the recess section 91, although the present general inventive concept is not limited thereto. For example, the fixed protrusion 97 may include a semicircular section.

Further, the fixed protrusion 97 may protrude from the pressing surface 95 of the fixing member 90. The fixed protrusion 97 can be positioned at the inner portion of the recess section 91 such that the distance between the support surface 93 and the fixed protrusion 97 is substantially equal to or slightly smaller than thickness of the PCB 73.

According to the above configuration, the PCB 73 can be press-fitted into the recess section 91 of the fixing member 90, so the PCB 73 can be assembled to the bottom cover 12 without using screws. Thus, the assembly time can be shortened and the productivity of the product can be improved.

After the PCB 73 is press-fitted into the fixing member 90, the rear surface 74 of the PCB 73 can make close contact with the support surface 93 of the fixing member 90 as illustrated in FIG. 4.

Consequently, heat generated from the LEDs 71 can be transferred to the support surface 93 of the fixing member 90 comprising the aluminum material having the superior heat conductivity, and then dissipated out of the LCD through the bottom cover 12. Thus, heat dissipation efficiency can be improved.

Figure 5:
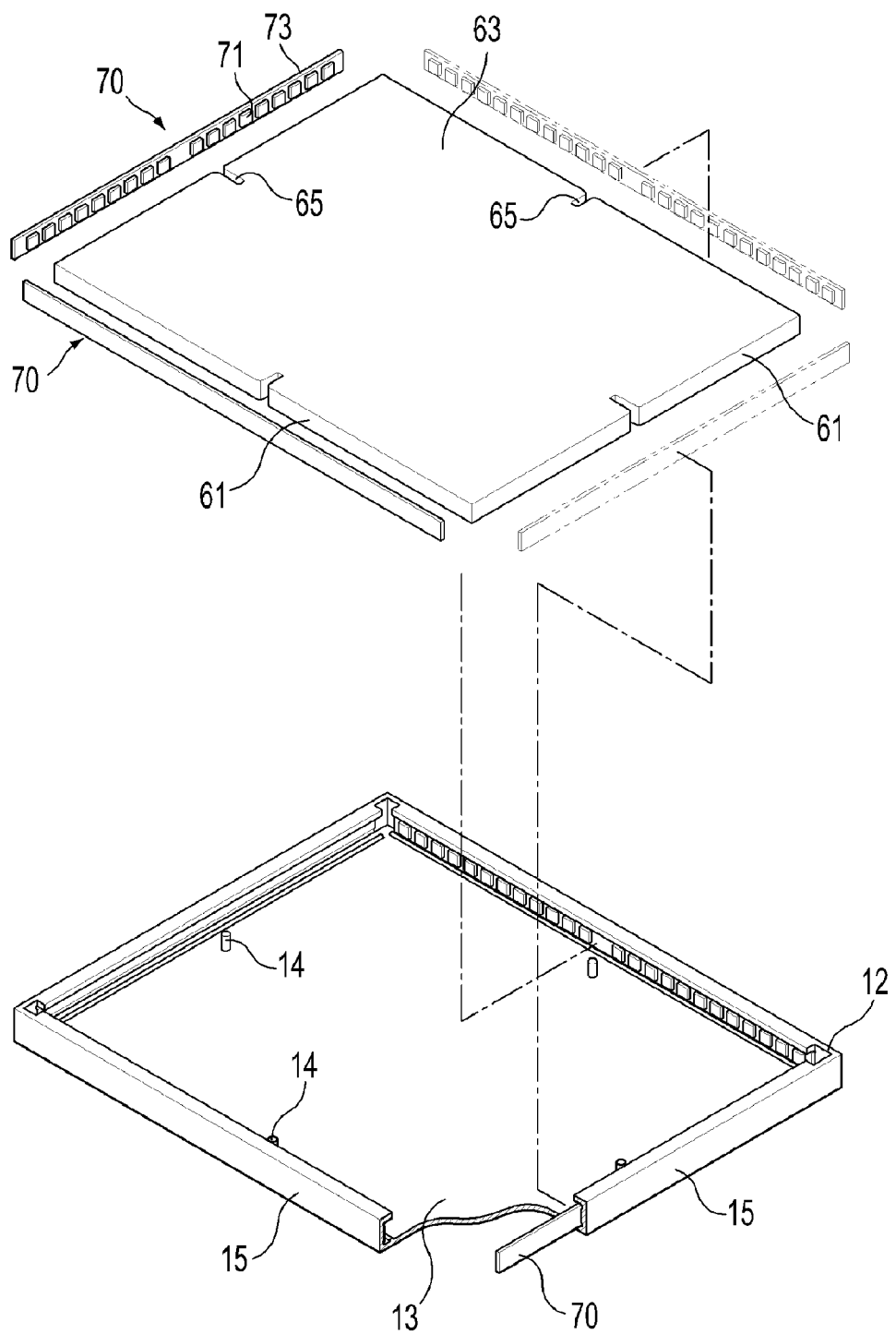
FIG. 5 is a perspective view illustrating a part of an LCD according to another embodiment of the present general inventive concept.
Figure 6:
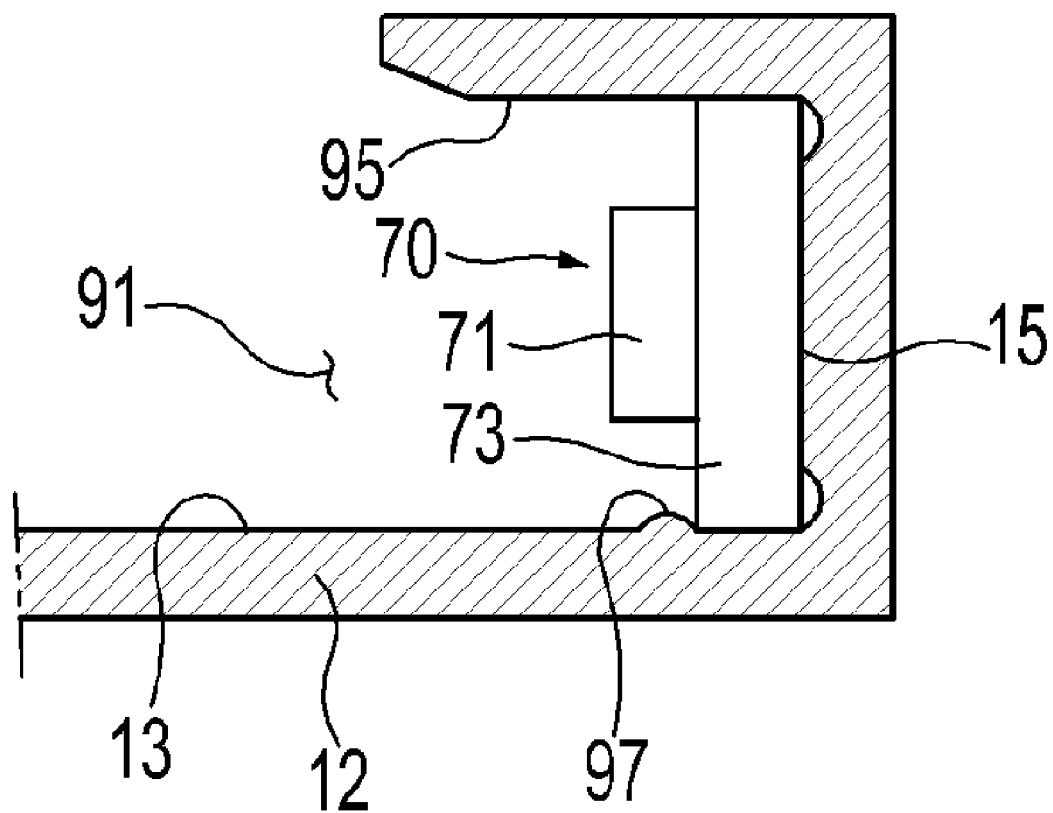
FIG. 6 is a sectional view illustrating an assembly state of a light source unit according to another embodiment of the present general inventive concept.

FIG. 5 is a perspective view illustrating the backlight unit according to another embodiment of the present general inventive concept, and FIG. 6 is a sectional view illustrating a coupling state of the light source unit according to the embodiment of FIG. 5. The same reference numerals are used to designate the same or similar elements in the previous example embodiments, and detailed description thereof will be omitted for convenience of description.

As illustrated in FIGS. 5 and 6, the light source unit 70 according to another embodiment of the present general inventive concept can be press-fitted into one side of the sidewall 15 of the bottom cover 12.

To this end, the bottom cover 12 can include the bottom surface 13, the sidewall 15 can extend upward from peripheral portions of the bottom surface 13, and the pressing surface 95 can be bent inward from one side of the sidewall 15.

In this example embodiment, the sidewall 15 of the bottom cover 12 can function as the support surface 93 of the fixing member 90 illustrated in the previous embodiment, so the recess section 91 can be formed by the pressing surface 95.

According to the example embodiment of FIGS. 5 and 6, since the fixing member 90 formed with the recess section 91 to fix the light source unit 70 is not necessary, the manufacturing cost can be reduced.

Although a few embodiments of the present general inventive concept have been illustrated and described, it will be appreciated by those skilled in the art that changes may be made in these embodiments without departing from the principles and spirit of the general inventive concept, the scope of which is defined in the appended claims and their equivalents.

What is claimed is:

1. A backlight unit comprising:
a light guide plate;
a printed circuit board having at least one light emitting diode to emit light toward an incident surface formed at one side of the light guide plate;
a bottom cover to receive the light guide plate and the printed circuit board therein; and
a fixing member comprising a recess section formed by a bottom surface of the bottom cover and a pressing surface parallel to the bottom surface, between which the printed circuit board is press-fitted, to fix the printed circuit board to the fixing member,
wherein the recess section is formed in one sidewall of the bottom cover.

2. The backlight unit of claim 1, wherein the fixing member comprises heat conductive metal.

3. The backlight unit of claim 2, wherein the fixing member comprises an aluminum extrusion member.

4. The backlight unit of claim 1, wherein the fixing member is integrally formed with the bottom cover.

5. The backlight unit of claim 1, wherein the fixing member comprises:
a support surface extending upward from the bottom surface of the bottom cover and wherein the pressing surface is bent inward from an edge of the support surface.

6. The backlight unit of claim 5, wherein the support surface is formed at upper and lower ends thereof with concave sections.

7. The backlight unit of claim 5, wherein the fixing member further comprises:
a fixed protrusion to allow the printed circuit board to contact the support surface.

8. The backlight unit of claim 5, wherein the fixed protrusion protrudes from the bottom surface of the bottom cover.

9. The backlight unit of claim 8, wherein the fixed protrusion has a semicircular section.

10. A liquid crystal display comprising:
a liquid crystal display panel; and
an edge-type backlight unit to supply light to the liquid crystal display panel,
wherein the backlight unit comprises:
a light guide plate;
a light source unit to irradiate the light onto the light guide plate;
a bottom cover to receive the light guide plate and the light source unit therein; and
a fixing member comprising a recess section formed by a bottom surface of the bottom cover and a pressing surface parallel to the bottom surface, between which the light source unit is press-fitted, to fix the light source unit to one side of an inner portion of the bottom cover,
wherein the recess section is formed in one sidewall of the bottom cover.

11. The liquid crystal display of claim 10, wherein the light source unit comprises:
at least one light emitting diode; and
a metal printed circuit board on which the light emitting diode is mounted.

12. The liquid crystal display of claim 11, wherein the fixing member comprises:
a support surface to contact a rear surface of the metal printed circuit board and wherein the pressing surface presses a top surface of the metal printed circuit board.

13. The liquid crystal display of claim 12, wherein the fixing member comprises heat conductive metal.

14. The liquid crystal display of claim 12, wherein the fixing member comprises an aluminum extrusion member.

15. The liquid crystal display of claim 14, wherein the fixing member is integrally formed with the bottom cover.

16. The liquid crystal display of claim 12, wherein the fixing member further comprises a fixed protrusion to prevent the metal printed circuit board from being separated from the recess section by allowing the metal printed circuit board to closely make contact with the support surface.

17. The liquid crystal display of claim 16, wherein the fixed protrusion protrudes from the bottom surface of the bottom cover and has a semicircular section.

18. A backlight unit of an LCD panel, comprising:
a light source;
a light guide plate having an edge surface to receive light from the light source; and
a cover member to receive the light guide plate and the light source therein, comprising:
a bottom surface to support the light guide plate, and
a recessed portion to press-fit the light source therein and to dissipate heat of the light source, and including a top surface to press the light source against the bottom surface,
wherein the recess section is formed in one sidewall of the bottom cover.

19. The backlight unit of claim 18, wherein the bottom surface includes a protruding portion to retain the light source against a side surface of the recessed portion.

20. The backlight unit of claim 18, wherein the recessed portion includes a side surface adjoining the top and bottom surfaces to contact a back surface of the light source to dissipate heat from the light source.

21. The backlight unit of claim 20, wherein the recessed portion includes concave portions disposed at adjoining portions of the top and side surface and the bottom and side surface, respectively, to alleviate deformation when the light source is press-fitted to the recessed portion.

* * * * *